June 10, 1930.　　　　S. A. STAEGE　　　　1,763,199
REGULATOR SYSTEM
Filed Aug. 6, 1925
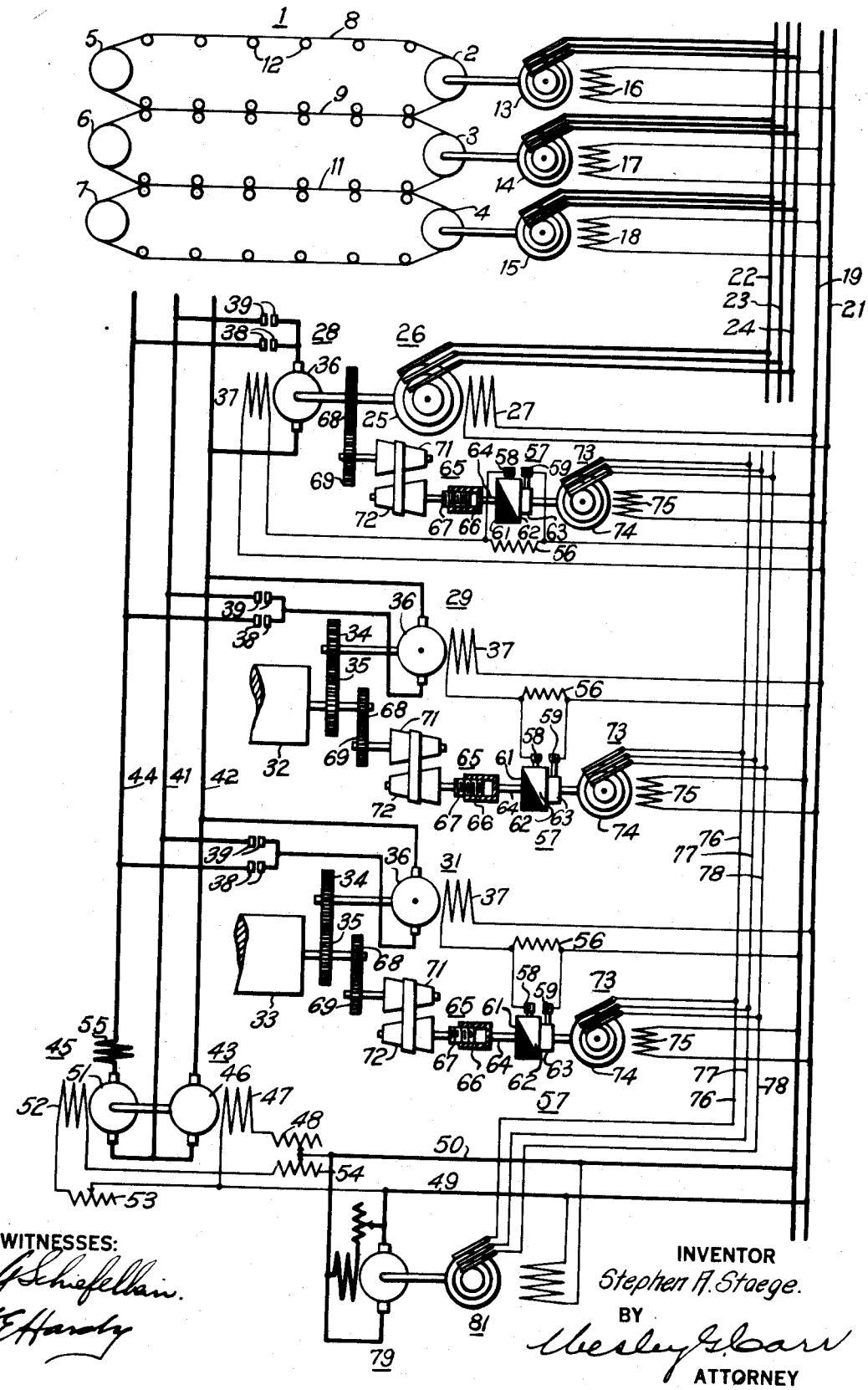
WITNESSES:
INVENTOR
Stephen A. Staege.
BY
ATTORNEY Patented June 10, 1930

1,763,199

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed August 6, 1925. Serial No. 48,566.

My invention relates to electric drives and more particularly to electric drives for the dryer rolls of a paper-making machine.

One object of my invention is to provide an electric drive system wherein a plurality of driven motors are maintained in exact speed harmony and are positive in their action.

Another object of my invention is to provide such a system wherein the dryer-driving motors may be gradually started from rest and operated at a slow speed, or may be accelerated to normal operating speed, without taking more energy from the prime mover than that required for normal-speed operation of the driving motors.

I provide a plurality of synchronous motors for driving the several dryer rolls of the paper-making machine and supply these motors from an alternating-current generator that is connected to be driven by a direct-current motor. This motor is one of a plurality of direct-current "section" motors that are employed for driving the several sections of the paper-making machine. The speed of the several section motors may be controlled by any well-known speed-regulating system, such as that described in my copending application, Serial #743,577, filed Oct. 14, 1924, and assigned to the Westinghouse Electric & Manufacturing Company.

When several section-driving motors are connected to be driven from a main generator that has associated therewith a bucking generator, the voltage of which opposes the voltage of the main generator, a low starting voltage may be provided without varying the main generator voltage, and without requiring the use of starting resistors, which ordinarily consume a large amount of power when the starting voltage is low.

In the accompanying drawing, the single figure is a diagrammatic view of apparatus and circuits organized in accordance with my invention.

Referring to the drawing, an electric dryer 1 is illustrated as provided with a plurality of driven rollls 2, 3, 4 and a plurality of cooperating tension rolls 5, 6 and 7, three pairs of the rolls being shown, although any number of pairs of driven and tension rolls may be used, depending upon the conditions of a particular paper-making installation. On each pair of rolls endless wire belts 8, 9 and 11 are operated, and a plurality of small rolls 12 are provided for maintaining the wire belts in the desired position. The driven rolls of the dryer are connected to synchronous motors having armature windings 13, 14 and 15, and field windings 16, 17 and 18 respectively. The field windings are connected to suitable direct-current supply conductors 19 and 21, and the armature windings are connected to three-phase supply conductors 22, 23 and 24, which are supplied with energy from the armature 25 of an alternating-current generator 26. The generator 26 is provided with a field winding 27 that is connected to the supply conductors 19 and 21.

A plurality of direct-current section-driving motors 28, 29 and 31 are provided, the motor 28 being connected to drive the alternator 26 and the motors 29 and 31 being connected to drive rolls 32 and 33, respectively, through similar gear-wheels 34 and 34. The section-driving motors are similar in construction and comprise armature windings 36 and field windings 37, the field windings being connected to the direct-current conductors 19 and 21. The armature windings are adapted to be connected, by means of the respective switches 39, across conductors 41 and 42, which are connected to a main direct-current generator 43; or, by means of the respective switches 38, across conductors 44 and 42, which are connected to an auxiliary or bucking generator 45 and to main generator 43, which are connected together in series circuit relation.

The main generator 43 comprises an armature winding 46 and a field winding 47 that is connected, through a resistor 48, and by means of conductors 49 and 50, to the direct-current supply conductors 19 and 21. The bucking generator 45 comprises an armature winding 51 that is connected in series circuit relation with the armature winding 46 of the main generator. The bucking generator is also provided with a field winding 52 that is connected, through variable resistors 53 and 54, and by means of conductors 49 and 50, to the direct-current supply conductors 19 and 21, and with a differentially wound series field winding 55. The motor starting system comprising the main generator 43 and the auxiliary generator 45 together with the control circuits therefor comprises the subject matter of my copending application Serial No. 43,207 filed July 13, 1925 and assigned to the Westinghouse Electric & Manufacturing Company.

In circuit with the field winding 37 of each of the several section motors, a resistor 56 is provided, and a rotary contactor 57 is associated with each resistor to vary the effective value thereof in accordance with variations in the speed of each section motor from that of a speed-reference means. Each rotary contactor 57 comprises a pair of brushes 58 and 59 that are connected to its associated resistor 56, and tapered non-conducting and conducting surface portions or segments 61 and 62 that are adapted to engage the brush 58. A conducting member or ring 63 that is connected to the conducting member 62 engages the brush 59 so that, as the rotary contactor drum revolves, the resistor 56 will be short-circuited during that portion of the revolution in which the brush 58 is in contact with the conducting segment 62. The duration or period of this short-circuit during a revolution of the rotary contactor, depends upon the axial position of the rotary contactor with respect to the brush 58, and the position of the rotary contactor is dependent upon the operation of an associated differential device 65.

Each differential device 65 comprises nut and worm engaging members 66 and 67, respectively, one of which is connected by means of a shaft 64 to the rotary contactor drum so as to slide this drum upon its axis in accordance with the operation of the differential device. One side of the differential device is connected by means of gear-wheels 68 and 69 and cone pulleys 71 and 72 to be operated in accordance with the speed of its associated section motor. The other side of the differential device is connected to be operated in accordance with the speed of its associated synchronous motor 73. Each motor 73 comprises armature windings 74 and field windings 75. The field windings are connected to the direct-current supply conductors 19 and 21, and the armature windings are connected to conductors 76, 77 and 78, which are supplied with a source of alternating current, from any suitable source such as from the motor-generator set 79, 81, the frequency of which may be varied to regulate the speed of the paper-making machine, as a whole.

When it is desired to start any one of the several section-driving motors 28, 29 and 31, the associated starting switch 38 is closed so as to impress upon the armature of the starting motor a voltage that corresponds to the voltage of the main generator 43 minus that of the bucking generator 45, the two generators being connected in series circuit relation and in voltage opposition. At the time that the starting switch 38 is closed, the voltage of the bucking generator will be substantially that of the main generator so as to impress a low voltage upon the motor being started. The series field winding 55, being differentially wound with respect to the field winding 52, causes the voltage of the generator 45 to decrease, thus increasing the voltage impressed upon the motor being started.

The excitation of the field winding 52 is then gradually decreased by means of rheostat 53, thus reducing the voltage of the bucking generator substantially to zero, under which condition the voltage impressed upon the motor being started will be that of the main generator. The main or running switch 39 may now be closed and the starting switch 38 opened. In the same manner, any other of the section motors may be started while certain of the motors are connected to the main generator for operating at normal speed.

In starting the electric dryer 1, the field windings 16, 17 and 18 of the several synchronous motors are connected to direct-current supply conductors 19 and 21, and the motor 28, which drives the alternator 26, is brought up to a fraction, say 10%, of its normal running speed, by closing the associated starting switch 38 and governing the excitation of the auxiliary generator 45, as explained above, and maintained at that speed for a short time until the several synchronous motors have started from rest and fallen into synchronism with the alternator.

By reason of the high starting torque of the dryer, the corresponding synchronous motors will not fall into step unless the speed of the alternator 26 is maintained quite low for a short time. After the synchronous motors are in synchronism with the alternator 26, the speed of the driving motor 28 may be increased to normal speed and this will correspondingly increase the speed of the alternator and of the synchronous motors.

The speed regulation of the group of section motors is dependent upon the frequency of the energy supplied through conductors 76, 77 and 78, from the generator 81 which frequency determines the speed of the synchronous motors 73 that drive one side of the differential devices 65. Under normal conditions, it is necessary for the two sides of the differential device, that is the nut and worm elements 66 and 67, to rotate at the same speed, so as to give a constant effective value to their associated resistor 56. If the speed of a section motor varies from the balanced condition, the cooperative action of the nut and worm elements of the differential will cause the rotary contactor drum to move, in the one or the other direction, thus varying the relative time that the brush 58 engages the conducting segment 62 and the non-conducting segment 61, thereby varying the effective value of the resistor 56 to establish the correct motor speed.

In order to change the speed of "the entire group of motors, the frequency supplied to the several synchronous motors 73 is varied, thereby causing the differential devices and the rotary contactor drums to vary their positions in such manner as to change the effective value of the resistors 56, and bring the speeds of the several section motors in harmony with that of the masterspeed-reference means 81. As the new motor speed is established, both sides of the differential device will again rotate at the same speed.

Many modifications may be made in the apparatus and in the arrangement of parts herein described without varying from the spirit of my invention, and I do not wish to be limited other than by the scope of the appended claims.

I claim as my invention:

1. In a speed-regulating system, a plurality of rotatable members, a plurality of direct-current motors for driving said members, means for governing the excitation of said motors to maintain a fixed speed ratio between said members, an alternator driven by one of said motors, and a plurality of synchronous motors for driving certain of said members connected to be driven by said alternator.

2. The method of operating a plurality of alternating-current synchronous motors which comprises applying a low-frequency current to said motors and permitting said motors to come into synchronism with said current, then increasing the frequency of said current to bring the motors to normal speed, and thereafter regulating the frequency of said current to maintain a predetermined speed relation between said motors and a speed reference means.

3. In a system of motor drives, a plurality of direct-current motors, a plurality of power sources for said motors, a plurality of alternating-current motors, and means for governing the speed of said motors to maintain a predetermined harmony between them.

4. In a system of motor drives, a plurality of rotatable members, a plurality of direct-current motors for driving said members, an alternating-current motor, a source of power for said alternating-current motor, means actuated by one of said direct-current motors for varying the frequency of current supplied to said alternating-current motor, and means for maintaining a predetermined speed harmony between said motors.

5. In a system of motor drives, a plurality of rotatable members, a plurality of direct-current motors for driving said members, a plurality of alternating-current motors for driving certain of said members, a source of power for said alternating-current motors, means actuated by one of said direct-current motors for varying the frequency of current supplied to said alternating-current motors, means for supplying a substantially constant-voltage current to said direct-current motors, and means cooperating therewith for supplying a like variable-voltage current to said several direct-current motors.

6. In a system of motor drives, a plurality of direct current motors, regulator means for each of said motors for governing them to run in substantial speed harmony, an alternating current generator driven by one of said motors, and a plurality of alternating-current motors controlled in accordance with the speed of said alternating current generator.

7. In a paper making machine comprising a plurality of rolls, a plurality of direct-current motors for driving certain of said rolls, regulating means for governing said motors to run in substantial speed harmony, a motor-generator set that is also regulated to run in substantial speed harmony with said motors, and a plurality of alternating current motors for driving certain of said rolls and connected to be driven in accordance with the speed of said motor-generator set.

8. In a sectional paper-making machine comprising a plurality of dryer rolls, a plurality of alternating current motors for driving said dryer rolls, a generator for supplying power to said motors, a plurality of direct current motors for driving said machine, one of said motors being connected to drive said generator, and regulator means for governing the speeds of said motors to run in substantial speed harmony.

9. In a sectional paper-making machine comprising a plurality of rolls, a plurality of direct current motors for driving said machine, an alternating current generator driven by one of said motors, synchronous motors driven by said generator and connected to drive certain of said rolls, and regulator means for governing the speeds of said motors to run in substantial speed harmony.

10. In a regulator system wherein a plurality of members are required to run in predetermined speed relation, individual direct-current motors for driving certain of said members, individual alternating-current motors for driving certain other of said members, a generator for supplying power to said alternating-current motors, means for regulating the speeds of said direct-current motors and separate means for regulating the speed of said generator to maintain the desired speeds of said alternating-current motors.

In testimony whereof, I have hereunto subscribed my name this 8th day of July, 1925.

STEPHEN A. STAEGE.